United States Patent
Kelly et al.

(10) Patent No.: US 12,547,448 B2
(45) Date of Patent: Feb. 10, 2026

(54) TECHNIQUES FOR ORDERING PROCESS ACTIVITY IN A CONCURRENT ENVIRONMENT

(71) Applicant: CrowdStrike, Inc., Sunnyvale, CA (US)

(72) Inventors: Martin Kelly, Bothell, WA (US); Milos Petrbok, Redmond, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 653 days.

(21) Appl. No.: 18/069,557

(22) Filed: Dec. 21, 2022

(65) Prior Publication Data

US 2024/0211305 A1 Jun. 27, 2024

(51) Int. Cl.
G06F 9/48 (2006.01)
(52) U.S. Cl.
CPC ................... G06F 9/4881 (2013.01)

(58) Field of Classification Search
CPC .................................................. G06F 9/4881
See application file for complete search history.

(56) References Cited

U.S. PATENT DOCUMENTS 11,265,291 B2 * 3/2022 Tsirkin ................ H04L 63/1441

* cited by examiner

*Primary Examiner* — Wissam Rashid
(74) *Attorney, Agent, or Firm* — Womble Bond Dickinson (US) LLP

(57) ABSTRACT

Trackable activity performed by a process executing in an operating system of a computing device is detected, the process associated with an initial sequence number and an initial message queue of a plurality of message queues, and each of the plurality of message queues comprising a first counter. Based on a comparison of the first counter to the initial sequence number, an assigned message queue of the process is set to the initial message queue or a second message queue of the plurality of message queues. A message is transmitted on the assigned message queue, the message comprising a process identifier of the process.

20 Claims, 7 Drawing Sheets

TECHNIQUES FOR ORDERING PROCESS ACTIVITY IN A CONCURRENT ENVIRONMENT

TECHNICAL FIELD

Aspects of the present disclosure relate to tracking process activity in an operating system, and more particularly, to tracking process activity in operating systems supporting concurrent operations.

BACKGROUND

Many modern operating systems are separated into a user space and a kernel space. The kernel space is typically more privileged, and may execute operations with an administrative privilege level that is protected from general access. One way to extend the functionality of an operating system (OS) may include the use of kernel drivers. Kernel modules may be separate modules which may be loaded into the operating system and executed with the administrative privilege level of the kernel within a structured framework. Kernel modules offer a way for those wishing to extend the functionality of the OS, such as hardware providers, to execute privileged operations.

In some scenarios, it may be beneficial to allow for execution of privileged operations through a more dynamic and/or secure interface than kernel drivers. One such mechanism is the extended Berkeley packet filter (eBPF). Infrastructure such as eBPF allows applications executing in user space to provide operational logic to be executed within the kernel space of the operating system. Such access, however, may be limited in functionality to increase security and reliability. For example, environments such as eBPF may limit the types of access and/or instructions that may be executed within the kernel space, which may limit the types of operations that may be performed in such environments.

Therefore, it may be useful to perform some portions of a given task using operational logic provided to the kernel space of the operating system (such as with eBPF) while performing other portions within the user space of the operating system, to take advantage of the additional functionality available in the user space. In such a scenario, the kernel-space-resident operational logic may need a communication path with user-space-resident application that is both high-performing and logically consistent.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
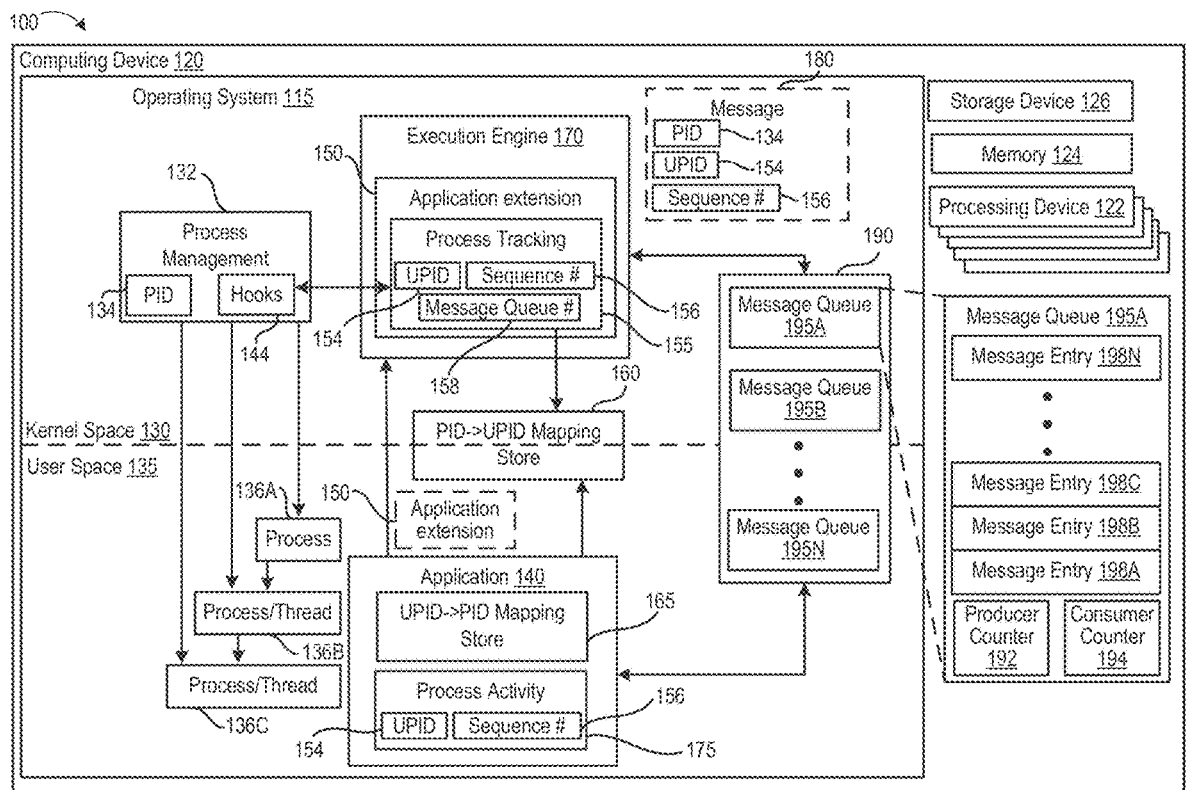
FIG. 1 is a block diagram that illustrates an example system, according to some embodiments of the present disclosure.

In infrastructures such as eBPF, where code is provided into the kernel space of the OS to execute, several security features may be present. For example, verification operations may be performed on the code that is to be run in the kernel space to confirm that the code will not expose vulnerabilities that may be exploited to access the kernel. In addition, the code that is to be run in the kernel space may be limited in the types of access it is allowed. For example, the code that is to be run in the kernel space may be denied access to certain functionality. Instead, the code that is to be run in the kernel may be limited to access of functions that are less likely to represent a risk to the kernel space. As an example, code provided to eBPF may be unable to access certain locks or may only have access to atomic operation (e.g., atomic increment/decrement) that do not return an incremented/decremented value from the atomic operation.

It may be useful for the code that is being run in the kernel to be able to uniquely track processes being executed. In some cases, the code that is being run in the kernel may be able to directly detect operations performed by a particular process using some of the more advanced permissions available in the kernel space. For example, security architectures may track behavior and/or transactions performed by a process to determine if they are malicious. Since the functionality available to code being run in the kernel may be limited, portions of the code to track a given process may be split between the user space and the kernel space of the operating system. To coordinate operations, communication paths may be established between the portions of the code resident in the kernel and the portions of the code operating in the user space of the operating system.

In some embodiments, message queues may be set up between the kernel-resident portion of the operational logic and the user-space portion of the operational logic. In infrastructures such as eBPF, for example, the message queues may be ring buffers, as will be described in more detail herein. The kernel-resident portion of the operational logic may place a message on the message queue that may be later retrieved by the user-space resident portion of the operational logic. In such a way, information (such as information related to the track processes being executed) may be shared between the kernel space and the user space of the operating system.

A message queue, however, may incur performance problems. If a single message queue is utilized between the kernel space and the user space, the amount of process tracking information may overwhelm the ability for the single message queue to effectively handle the message volume. For example, the message queue may have a limited number of entries. If a producer thread provides more messages to the message queue than a consumer thread can process, the number of message space in the message queue may be exceeded, and messages may be dropped.

One solution to such an approach may be to utilize multiple message queues. For example, for a system having a plurality of processing devices and/or cores, a message queue may be provided to execute on each of the processing devices/cores concurrently, with a plurality of producer threads and consumer threads executing concurrently to generate and/or process messages on the message queues.

Concurrent messaging has issues as well. In some cases, it may be important for the messages sent between the kernel-space-resident operational logic and the user-space-resident operational logic to be logically ordered. For example, it may be important for a consumer thread processing the messages to process a message associated with the creation of a process before processing a message associated with the exit of the process. In some cases, this ordering may be enforced if all the messages for a given process to be sent to a same message queue, which may be processed in order.

When multiple processes are being tracked, good concurrency may be achieved if the processes are distributed across the available message queues (e.g., in a round-robin fashion). However, in some cases, ordering may still be important between processes. For example, if a parent process spawns a child process, it may be important for the consumer thread(s) processing the messages to detect the creation of the parent process before processing the creation of the child process. If the messages associated with the parent process are placed on one message queue, while the messages associated with the child process are placed on a different message queue, there is an opportunity for the ordering of the messages with respect to the parent process and the child process to be confused.

The present disclosure addresses the above-noted and other deficiencies by providing techniques for managing message coherency with respect to process tracking while still utilizing multiple message queues. In some embodiments, multiple message queues may be utilized to convey messages between kernel-space instructions and user-space instructions. Each of the message queues may include a producer counter and a consumer counter. The kernel-space instructions may associate each process being tracked in an operating system with a sequence number, and may include this sequence number in messages placed on the message queue. The user space instructions may process the messages on the message queue, and update the counter with the sequence number from each processed message. When the kernel space instructions begin tracking a process, they may assign it to one of the plurality of the message queues. The assignment may be based on the state of the message queue of the parent of the process to be tracked. If the consumer counter of the message queue of the parent of the process to be tracked is greater than or equal to the sequence number associated with the parent of the process to be tracked, the process to be tracked may be assigned to any of the message queues, and all further messages related to that process may be sent to that message queue. Alternatively, if the consumer counter of the message queue of the parent of the process to be tracked is less than the sequence number associated with the parent of the process to be tracked, the process to be tracked may be assigned to the same message queue to which its parent is assigned.

The embodiments described herein provide improvements over some process tracking techniques utilized in infrastructures similar to eBPF. The techniques described herein provide for the generation of consistent messaging with respect to process tracking that allows for the messages associated with a particular process hierarchy to be maintained consistently, while still supporting multiple message queues that improve performance. Embodiments according to the present disclosure may provide a technological improvement that improves the operation of a computing device by allowing for the tracking of process creation for long-term analysis in a consistent way that enforces certain types of message ordering despite the complexities associated with process creation that can be present in many operating systems.

For example, embodiments of the present disclosure may be able to support at least two features with respect to process tracking of multiple processes. A first non-limiting example feature is that, for a given process, all activity may be read by a consumer (e.g., user-space resident instructions) of a message queue in the same order it was generated by a producer (e.g., kernel-space resident instructions) of the message for the message queue. A second non-limiting example feature is that messages associated with the creation of parent of a process may be read by the consumer of the message queues prior to a creation of the process. In some embodiments, the notion of a parent of a process may be extended beyond just the direct parent process as maintained by the operating system, but may also include other types of parentage, such as the last process in the ancestry of a given process that last performed an exec operation, as will be described in further detail herein. These are only two example features, and other features may be accomplished without deviating from the scope of the present disclosure.

FIG. 1 is a block diagram that illustrates an example system 100, according to some embodiments of the present disclosure. FIG. 1 and the other figures may use like reference numerals to identify like elements. Thus, the same or similar numbers may be described with reference to other drawings even if they are neither mentioned nor described in the corresponding drawing. Also, elements that are not denoted by reference numbers may be described with reference to other drawings. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as one or more processing device(s) 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be non-uniform access (NUMA), such that memory access time depends on the memory location relative to processing device 122. It should be noted that although, for simplicity, a single memory device 124 is depicted in the computing device 120 depicted in FIG. 1, other embodiments of the computing device 120 may include multiple memory devices, storage devices, or other devices.

Processing device(s) 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device(s) 122 may also include one or more special-purpose processing devices such as an application specific integrated circuit (ASIC), a field programmable gate array (FPGA), a digital signal processor (DSP), network processor, or the like. In FIG. 1, a plurality of processing devices 122 are illustrated, but the embodiments of the present disclosure are not limited to such a configuration. In some embodiments, the processing devices(s) may include one or more execution cores. As used herein, the term processing device 122 is intended to also include execution cores of a processing device 122.

The storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In some embodiments, the storage device 126 may be used to store computer instructions which may implement one or more operations described herein. For example, the storage device 126 may store the computer instructions, which may be loaded into memory 124 and executed by the processing device(s) 122.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may execute an operating system 115. The operating system 115 of computing device 120 may manage the execution of other components (e.g., software, applications, etc.) and/or may manage access to the hardware (e.g., processing device(s) 122, memory 124, and/or storage devices 126, etc.) of the computing device 120. Operating system 115 may be software to provide an interface between the computing hardware (e.g., processing device(s) 122 and/or storage device 126) and applications running on the operating system 115. Operating system 115 may include a kernel space 130 and a user space 135 supporting the execution of one or more applications 140. Though only a single application 140 is illustrated in FIG. 1, it will be understood that a plurality of applications 140 may be present. Operating system kernel space 130 may include several operating system functionalities, including but not limited to process management, hardware interfaces, access control and the like. Functions executing within the kernel space 130 may execute with an elevated privilege and may manage the administration of the operating system 115. Examples of operating systems 115 include WINDOWS™, LINUX™, ANDROID™, IOS™, and MACOS™.

As illustrated in FIG. 1, computing device 120 may execute (e.g., using processing device 122) an application 140. Application 140 may be a desktop application, a network application, a security application, a database application, or any other application that may be executed by the operating system 115. Portions of an application 140 executing within the user space 135 may execute with a reduced privilege as compared to the kernel space 130, and may utilize standardized application programming interfaces (APIs), such as system calls, to access the functionality of the kernel space 130 of the operating system 115. In some embodiments, the application 140 may include functionality represented by an application extension 150 that is to be executed in the kernel space 130. The application extension 150 may be or include executable instructions that are provided by the application 140 to the kernel space 130 via an API, to be executed within the kernel space 130 utilizing the administrative privileges and/or access of the kernel space 130.

The application 140 may provide the application extension 150 to an execution engine 170 within the kernel space 130. In some embodiments, the application extension 150 may be or include bytecode, though the embodiments of the present disclosure are not limited to such a configuration. In some embodiments, bytecode includes object code that may be converted to machine code (e.g., binary instructions compatible with processing device(s) 122) by the execution engine 170. In some embodiments, the execution engine 170 may be part of an eBPF infrastructure executing within the kernel space 130 and the application extension 150 may be eBPF-compatible bytecode.

The execution engine 170 may execute the application extension 150 within the context of the kernel space 130. For example, the execution engine 170 may execute the application extension 150 with the administrative privileges and access of the kernel space 130. This may allow the application extension 150 to perform privileged operations not available to the application 140 executing in user space 135.

To assist in security of the operating system 115, the application extension 150 may be subject to certain limitations during its execution. For example, the application extension 150 may not have full access to all of the APIs available to other portions of the kernel space 130. In some embodiments, the application extension 150 may not have access to fully-functional atomic operations, software locks, and/or hardware randomization devices.

In some embodiments, while executing, the application extension 150 may exchange one or more messages 180 with application 140. In some embodiments, the message 180 may be exchanged utilizing a message store 190. In some embodiments, the message store 190 may include a plurality of message queues 195. For example, FIG. 1 illustrates that the message store 190 includes message queue 195A, message queue 195B, up to message queue 195N. This arrangement of message queues 195 is merely an example to facilitate description of the present disclosure, and is not intended to limit the embodiments described herein.

The application extension 150 may send and/or store a message 180 into a message queue 195 of the message store 190 for storage and the message 180 may be retrieved by the application 140 for processing. In some embodiments, the message store may be provided in the memory 124 of the computing device, and the message 180 may be stored in memory (e.g., memory 124) allocated for the message store 190. In some embodiments, the individual message queues 195 of the message store 190 may be implemented as a ring buffer. A ring buffer includes data structures that utilize a linear buffer in memory that is accessed as if it were connected end-to-end (e.g., circularly). In some embodiments, a ring buffer may be accessed in a first-in-first-out (FIFO) manner.

The use of the message queues 195 of the message store 190 may allow the application extension 150 to exchange data and/or other message payloads with the application 140 using the messages 180. For example, the application extension 150 may perform a monitoring function that is capable of analyzing processes 136 that are created within the privileged kernel space 130. The application extension 150 may be able to detect the creation of a process 136 and inform the application 140 of the creation by using message 180.

A process management engine 132 may execute within the kernel space 130 of the operating system 115. The process management engine 132 may be a portion of the operating system 115 responsible for creating, destroying, and/or tracking processes 136 executing on the computing device 120. Processes 136 may be structures that facilitate the operation of executable code within the user space 135. Though not expressly illustrated in FIG. 1, application 140 may execute within a process 136.

When a request is made to generate a new process 136, the process management engine 132 may create the process 136 and generate a process identifier (PID) 134 that is to be associated with the process 136. In some embodiments, the PID 134 is an integer. Three processes 136 are illustrated in FIG. 1 for ease of discussion, but this is merely an example. For example, a first process 136A, a second process 136B, and a third process 136C are illustrated in FIG. 1, but this is only an example and is not intended to limit the embodiments of the present disclosure.

In some embodiments, the PID 134 generated by the process management engine 132 may be a PID 134 that has been previously used for another process 136 that has since been destroyed. For example, the process management engine 132 may maintain uniqueness for PIDs 134 for the currently executing processes 136 of the operating system 115, but once a process 136 exits and/or is destroyed, the PID 134 for that process may be reused. To overcome this problem, a unique process identifier 154, also referred to as a UPID 154, may be generated to be associated with the process ID 134. For example, a 64-bit value may be generated for each created process 136, which may accommodate up to $(2^{64}-1)$ or $(2^{(64-n)}-1)$ (if n bits are reserved, e.g., n=1) PIDs 134. For those processes 136 which are to be tracked, a new UPID 154 may be created that is mapped to the PID 134 of the new process 136. Security tracking may utilize the UPID 154 for tracking the process 136 rather than the PID 134 so that the tracking may not be impacted by any potential reuse of PIDs 134. In some embodiments, the UPID 154 may be a numeric value. In some embodiments the UPID 154 may be a 64-bit value. As will be described herein, in some embodiments a UPID 154 may not be associated with every process 136, but may be assigned once the process 136 has performed activity which has performed some type of trackable activity (such as an exec operation) that the application 140 wishes to track.

As used herein, a UPID 154 may refer to a value (a UPID) that can be associated with a process 136 and/or a PID 134 and is sufficiently unique so as to uniquely identify that process 136 and/or PID 134 for a reasonable timeframe. For example, though a unique PID 154 may eventually be reused, a UPID 154 may not be reused over a reasonable timeframe over which the UPIDs 154 are to be analyzed. As a non-limiting example, the timeframe may be three months or more, six month or more, or a year or more, depending on the underlying functionality being supported. This type of uniqueness may also be referred to as a pseudo-unique value and/or a probabilistically unique value. A UPID 154 of a size described herein may still be exposed to reuse (e.g., a value that wraps) given a long enough time of operation. However, as used herein, the term "unique" is not to imply a limitation to only those embodiments in which a value is strictly unique over an infinite timespan. Stated another way, the use of the term "unique" used within the specification and the claims is not intended to limit interpretations of the embodiments to values which are strictly unique (i.e., incapable of being reused over an infinite timespan). In some embodiments, uniqueness of a UPID 154 is defined with respect to a particular computing device 120. For example, a given UPID value may be used to represent different processes 136 on different computing devices 120.

In order to track the processes 136, it may be useful to detect the creation of the processes 136 in-line the creation of the process 136 (e.g., within the same stack of the system call used to create the process). Thus, the application extension 150 executing within the execution engine 170 within the kernel space 130 may be able to detect the creation of the process 136, and operations of the process 136, more effectively than code running in the user space 135. In order to generate a pseudo-unique UPID 154 to associate with a given process 136 that may be unique over a longer period of time, the application extension 150 may include a process tracking engine 155 configured to generate the UPID 154 for each process 136 created by the process management engine 132 that the process tracking engine 155 wishes to track. As part of generating the UPID 154, the process tracking engine 155 may maintain a process ID to unique ID (PID-to-UPID) mapping store 160. In some embodiments, the PID-to-UPID mapping store may be maintained in memory that is accessible to both the application extension 150 as well as the application 140.

The process tracking engine 155 may be configured to detect the creation and operations of the processes 136 and to maintain the PID-to-UPID mapping store 160 to associate a generated UPID 154 with processes 136 of the operating system 115. In some embodiments, the PID-to-UPID mapping store 160 may be initialized to an invalid state (e.g., 0) for each UPID 154 and then populated with a generated UPID 154 when and/or if the associated process 136 performs a trackable activity (such as an exec operation).

The process tracking engine 155 may add and/or utilize hooks 144 in the execution stream of the operating system 115. The hooks 144 may detect operations for the creation of a process 136 by the process management engine 132, along with other trackable activities of the process '36. In some embodiments, the hooks 144 may allow the process tracking engine 155 to be called and/or notified when certain operations (also referred to herein as trackable activities) are performed on behalf of the process 136 (such as a fork and/or an exec, as will be described further herein). In some embodiments, these operations may be performed by system calls that execute operations within the kernel space 130. Other types of trackable activity that may be detected by the hooks 144 include activity of interest to the process tracking engine 155 that the process tracking engine 155 may be able to detect. Examples of a trackable activity include, but are not limited to, performing an exec operation, accessing a network connected to the computing device 120, performing an access to storage (e.g., storage device 126), accessing specialized hardware, such as a cryptographic device and/or graphics processing unit (GPU), or other computing operation.

In response to detecting trackable activity, the process tracking engine 155 may generate a new UPID 154 for the process 136 performing the trackable activity. In addition to generating the UPID 154, the process tracking engine 155 may also generate a sequence number 156 and a message queue number 158 for the process 136 performing the trackable activity. The process tracking engine 155 may update the PID-to-UPID mapping store 160 to associate a PID 134 of the process 136 performing the trackable activity with the generated UPID 154, the sequence number 156, and the message queue number 158. For example, given a PID 134 for a process 136, the PID-to-UPID mapping store 160 may map the PID 134 to a UPID 154, a sequence number 156, and/or a message queue number 158 that are associated with the PID 134.

The sequence number 156 may be utilized to identify a processing status of a message 180 associated with a given UPID 154 within a given message queue 195. In some embodiments, the sequence number 156 may be an integer. In some embodiments, as will be described further herein, the sequence number 156 may be associated with and/or derived from a counter of a message queue 195. The selection of the sequence number 156 will be described further herein with respect to FIGS. 3A, 3B, and 3C.

The message queue number 158 may be utilized to identify to which of the message queues 195 the messages 180 related to the UPID 154 are to be sent. In some embodiments, the message queue number 158 may be a number, such as an index, that identifies a particular message queue 195 of the plurality of message queues 195, but the embodiments described herein are not limited to such a configuration. The selection of the message queue number 158 will be described further herein with respect to FIGS. 3A, 3B, and 3C.

In response to detecting the trackable activity for a particular process 136, the process tracking engine 155 may generate a message 180. The message 180 associated with the process 136 may include, for example, the PID 134 for the process, the UPID 154 associated with the process 136, and the sequence number 156 associated with the process 136. In some embodiments, each of the UPID 154, the message queue number 158, and/or the sequence number 156 may be obtained from the PID-to-UPID mapping store 160. For a given message 180, the process tracking engine 155 may place the message 180 on the message queue 195 that is indicated by the message queue number 158. The message 180 may include, in some embodiments, the PID 134, the UPID 154, and/or the sequence number 156 associated with the process 136 indicated by the message 180.

Responsive to the message 180 in the message store 190, the application 140 may create and/or update a UPID-to-PID mapping store 165. For example, the application 140 may generate a mapping that maps a UPID value 154 to a PID value 134, and place the mapping within a UPID-to-PID mapping store 165. In some embodiments, the UPID-to-PID mapping store 165 may allow for executing code instructions that have a reference to a value of a UPID 154 to retrieve the value of a PID 134 that correspond to the UPID 154. In some embodiments, the UPID-to-PID mapping store 165 may be maintained separately from, and in a different format, from the PID-to-UPID mapping store 160. In some embodiments, the UPID-to-PID mapping store 165 may be a sorted tree that utilizes the UPID 154 to identify a leaf of the tree that contains the PID 134. For example, the UPID-to-PID mapping store 165 may be implemented as an AVL tree. Though an AVL tree is described as an example for the UPID-to-PID mapping store 165, it is an example only, and not intended to limit the embodiments of the present disclosure. It will be understood that other formats, trees, or mapping mechanisms may be used for the UPID-to-PID mapping store 165 without deviating from the embodiments of the present disclosure.

In FIG. 1, it is illustrated that the message 180 contains a UPID 154, sequence number 156, and a PID 134, but the embodiments of the present disclosure are not limited to this configuration. In some embodiments, the message 180 may contain only the PID 134. In such an embodiment, the application 140, upon receiving the message 180, may access the PID-to-UPID mapping store 160 to retrieve the associated UPID 154 and/or the associated sequence number 156 for the provided PID 134.

The operations of the application 140 with respect to the creation and/or maintenance of the UPID-to-PID mapping store 165 may be performed asynchronously with respect to the operations of the process tracking engine 155. Thus, the process tracking engine 155 may be able to perform time-sensitive operations related to the creation of a process 136 and an associated PID 134 so as to create a UPID 154 and/or sequence number 156 to track the new PID 134. The maintenance of the UPID-to-PID mapping store 165, which may include operations to rebalance the UPID-to-PID mapping store 165, may be performed as a lazy update, thus reducing the number of operations performed in the kernel space 130, which may be resource and/or performance sensitive.

In addition, because the maintenance of the UPID-to-PID mapping store 165 may be more complex, it may be more efficiently handled by application 140 in user space 135, rather than through the use of application extension 150 in kernel space 130. The user space 135 may have access to a more extensive array of APIs or other software executable code than may be available to the application extension 150 in the execution engine 170.

In some embodiments, the application 140 may generate process activity data 175 associated with a given process 136. The process activity data 175 may track information about activities of the process 136. For example, information about the creation of the process, activities (e.g., system calls, network access, etc.) of the process 136, other children processes 136 created by the process 136, a termination of the process 136, and the like may be collected and tracked. In some embodiments, the application 140 may receive the process activity data 175 from messages 180 sent by the application extension 150 executing in the kernel space 130 of the operating system 115. For example, the application extension 150 may utilize the hooks 144 and/or other mechanisms within the operating system 115 to capture events associated with processes 136 executing on the operating system 115. These events may be transferred to the application 140 (e.g., utilizing messages 180 in message store 190) and used to generate the process activity data 175. In some embodiments, the process activity data 175 may be generated and/or modified to include the UPID 154 and/or the sequence number 156 that are associated with the PID 134 of the process 136. In some embodiments, the process activity data 175 may be transmitted externally to the computing device 120. The use of the pseudo-unique UPID 154 may allow for the process activity data 175 of the process 136 to be uniquely tracked with respect to other processes 136 of the computing device 120, even if PIDs 134 are reused.

Though FIG. 1 illustrates the process activity data 175 as part of the application 140, this is merely for convenience of description and is not intended to limit the embodiments of the present disclosure. In some embodiments, the process activity data 175 may be generated by other applications utilizing the UPID 154.

As illustrated in FIG. 1, the message store 190 used to communicate between the application extension 150 and the application 140 may include a plurality of message queues 195. In some embodiments, the message 180 may be placed on a particular message queue 195 of the message store 190 based on the message queue number 158 associated with the PID 134 of the message 180. For example, the PID 134 may be used to reference the PID-to-UPID mapping store 160 to identify the message queue number 158 associated with the PID 134. Based on the message queue number 158 associated with the PID 134, the message 180 may be placed on a particular message queue 195 (e.g., a first message queue 195A) of the plurality of message queues 195.

FIG. 1 illustrates an example structure of a first message queue 195A of the plurality of message queues 195. The structure illustrated in FIG. 1 is merely an example, and is not intended to limit the embodiments of the present disclosure. The following description will reference the structure of the example message queue 195A, but it will be understood that the description may apply equally to any of the message queues 195.

As illustrated in FIG. 1, a given message queue 195A may include a plurality of a message entries 198. (FIG. 1 illustrates message entries 198A to 198N). Each of the message entries 198 may be a data store (e.g., a portion of memory 124) configured to store a message 180. Thus, the message queue 195A may include a plurality of messages 180. Further details for how the messages 180 are assigned to the message queue 195A and processed from the message queue 195A will be described with reference to FIGS. 2, 3A, 3B, and 3C.

The message queue 195A may also include a producer counter 192 and a consumer counter 194. The producer counter 192 may be utilized by instructions generating messages 180 for the message entries 198 of the message queue 195A, such as the process tracking engine 155. In some embodiments, the producer counter 192 may be an integer, though the embodiments of the present disclosure are not limited to this configuration. Further description of the operation of the producer counter 192 may be described herein with respect to FIGS. 3A, 3B, and 3C.

The consumer counter 194 may be utilized by instructions processing messages 180 from the message entries 198 of the message queue 195A, such as the application 140. In some embodiments, the consumer counter 194 may be an integer, though the embodiments of the present disclosure are not limited to this configuration. In some embodiments, the producer counter 192 and the consumer counter 194 may be operated independently (e.g., by the application extension 150 and/or the application 140, respectively) such that locking may be unnecessary and/or reduced.

Figure 2:
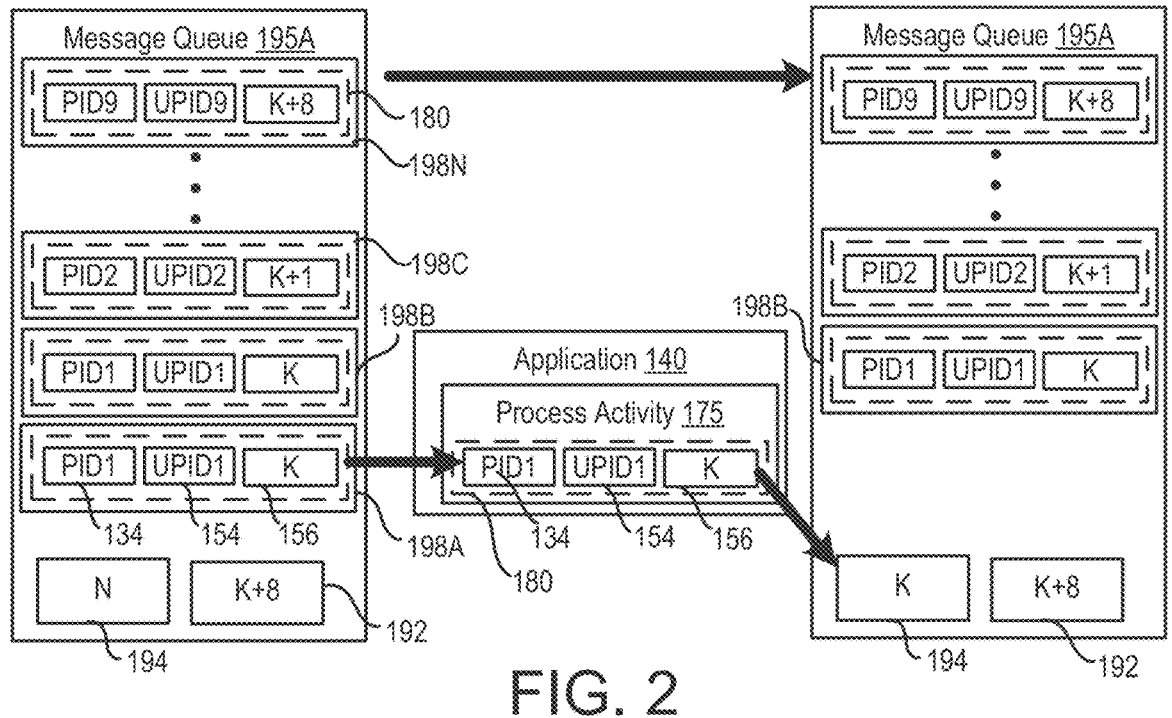
FIG. 2 is a block diagram illustrating the operation of a consumer of a message queue, in accordance with some embodiments of the present disclosure.

FIG. 2 is a block diagram illustrating the operation of a consumer of a message queue 195, in accordance with some embodiments of the present disclosure. FIG. 2 is an example only, and is not intended to limit the embodiments of the present disclosure. A description of those elements of FIG. 2 that have been previously described will be omitted for brevity.

Referring to FIG. 2, the application 140 may consume messages 180 from the message entries 198 of a given message queue 195A. While consuming the messages 180, the contents of the message entries 198 of the message queue 195A may change, as illustrated in FIG. 2. In FIG. 2, it is illustrated that the application 140 is analyzing a single message queue 195A, but this is merely for ease of description. In some embodiments, the application 140 may process each of the message queues 195 of the plurality of message queues 195 (see FIG. 1).

The application 140 may sequentially consume each of the messages 180 from the message entries 198 one at a time. As part of processing the message 180, the data of the message may be added to process activity data 175. For example, a given message 180 may include, among other data, a PID 134, a UPID 154, and a sequence number 156. In processing the message 180, the application 140 may add one or more of the PID 134, the UPID 154, and the sequence number 156 to the process activity data 176. For example, the message 180 may include information about activity performed by a given process 136, and the PID 134, the UPID 154, and/or the sequence number 156 may be data values associated with that process 136 (e.g., as stored in the PID-to-UPID mapping store 160 illustrated in FIG. 1) that may be stored in the process activity data 175 to track the activity of the process 136. In FIG. 2, as an example only, the message 180 is shown having a PID 134 with a value of 'PID1', a UPID 154 having a value of 'UPID1' and a sequence number 156 having a value of 'K'. These example values are intended to represent integer values and are not intended to limit the embodiments of the present disclosure.

In FIG. 2, it is illustrated that the message queue 195A includes a producer counter 192 having a value of 'K+8' and a consumer counter 194 having a value of 'N'. The values of 'N' and 'K+8' are intended to represent integer values and are not intended to limit the embodiments of the present disclosure.

After processing a particular message 180, the application 140 may remove the processed message entry 198A and may update the consumer counter 194 for the message queue 195A. In some embodiments, the application 140 may update the consumer counter 194 to have the value of the sequence number 156 for the message 180 processed by the application 140. In FIG. 2, it is illustrated that the message 180 contains the sequence number 156 with the value of 'K'. Thus, as illustrated in FIG. 2, the consumer counter 194 of the message queue 195A may be updated to have the value of 'K' after the message 180 is processed and the message entry 198A is removed from the message queue 195A. Though it is described that a message entry 198A is "removed," this is only for purposes of describing the operations and is not intended to limit the embodiments of the present disclosure. In some embodiments, a pointer may be utilized to indicate a current message entry 198 to be processed, and the pointer may be incremented after processing a particular message entry 198. FIG. 2 illustrates the transition of the message queue 195A upon the processing of the message entry 198A and the updating of the consumer counter 194.

The described operations may be sequentially repeated for each of the message entries 198 of the message queue 195A. For each of the message entries 198, the message 180 of the message entry 198 may be processed (e.g., added to process activity data 176) and the message 180 and/or message entry 198 may be removed from the message queue 195, and the consumer counter 194 may be updated with the sequence number 156 processed from the message 180.

The message queue 195A may be processed in a First-In-First-Out (FIFO) manner such that message entries 198 will be processed in the order that they were added to the message queue 195A. Thus, for message entries 198 within a given message queue 195, the messages 180 of the message entries 198 may be processed in an order in which they were added.

Referring back to FIG. 1, the sequence numbers 156 utilized in the messages 180 may be updated for a given process 136 twice. An initial value for the sequence number 156 may be assigned for a given process 136 at the time the process 136 is first created. The sequence number 156 may be updated again when the process 136 performs a trackable activity. As a result of the trackable activity, a UPID 154 may be generated for the process 136, a message queue 195 may be selected for the process 136, and/or an updated sequence number 156 may be generated for the process 136 based on the selected message queue 195.

Figure 3A:
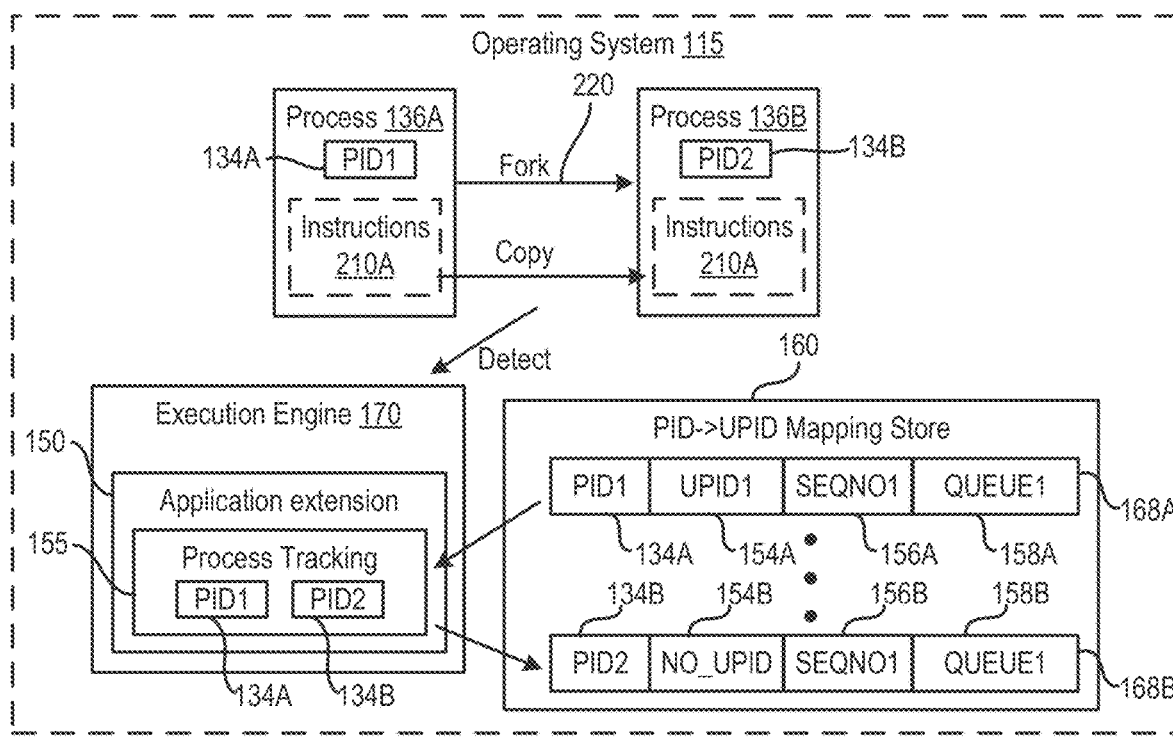
FIG. 3A is a block diagram illustrating the initialization of a sequence number associated with a process, in accordance with some embodiments of the present disclosure.

FIG. 3A is a block diagram illustrating the initialization of a sequence number 156 associated with a process 136, in accordance with some embodiments of the present disclosure. FIG. 3A is an example only, and is not intended to limit the embodiments of the present disclosure. A description of those elements of FIG. 3A that have been previously described will be omitted for brevity.

Referring to FIG. 3A, the sequence number 156 may be initialized for a given process 136 and stored in the PID-to-UPID mapping store 160 upon detection of the creation of the process 136. As illustrated in FIG. 3A, the detection of the creation of a process 136 may include, for example, detecting the creation of a child process 136B by a parent process 136A having instruction codes 210A (also referred to herein as instructions 210A). In some embodiments, the creation of a process 136 (e.g., by process management engine 132) may be separated in some operating systems 115 from the loading of new instructions codes (e.g., an executable image) within the process 136.

Referring to both FIGS. 1 and 2A, a first process 136A may be generated within operating system 115. The first process 136A may spawn additional processes, each having a different PID. In operating systems supporting aspects of the Portable Operating System Interface (POSIX) standard, spawning a new process may follow a sequence of events that can make tracking process activity difficult. For example, spawning a new process 136 may include first performing an operation typically called a fork, which creates a child process 136N as a copy of the parent process 136A, including the instruction codes 210 and memory space. In an operation implementing the fork operation as a fork system call, the child process 136B may return from the system call in the same manner as the parent process 136A (e.g., within the copy of the parent instruction codes 210A), and may continue executing from that point.

For the purposes of explanation, it is assumed that the first process 136A was created at some point during the operation of the operating system 115. The first process 136A may include first instructions (also referred to computer instructions and/or instruction codes) 210A. The first instructions 210A may represent computer instruction codes 210A loaded, for example, into memory 124 from storage device 126. The first instructions 210A may represent the computer instructions that are executed by the processing device 122 to perform the operations of the first process 136A.

In some embodiments, the first process 136A may perform a fork operation 220. The fork operation 220 may generate a second process 136B. As part of the generation of the second process 136B, the first instructions 210A of the first process 136A may be copied to the second process 136B so that the second process 136B also contains the first instructions 210A. Though described as a copy, it will be understood that this may not mean that a separate physical copy operation is necessarily performed. In some embodiments, the copy operation may be a copy-on-write operation in which the second process 136B contains a pointer to the first instructions 210A. In some embodiments, as part of the fork operation, the new process 136B may be given a second PID 134B (illustrated as having a value of 'PID2') that is different from a first PID 134A of the parent process 136A (illustrated as having a value of 'PID1').

In response to detecting the fork operation 220 that generates the new process 136B, the process tracking engine 155 may update the PID-to-UPID mapping store 160 to generate a new mapping 168B that maps the new process 136B to a UPID value 154B, a sequence number value 156B, and a queue number value 158B. In some embodiments, some entries of the new mapping 168B may be based on values from the mapping 168A within the PID-to-UPID mapping store 160 for the parent process 136A that created the child process 136B.

For example, the process tracking engine 155 may utilize the PID 134A from the parent process 136A to access the PID-to-UPID mapping store 160 to retrieve a mapping 168A including the values of the sequence number value 156A and the queue number value 158A from the parent process 136A. In some embodiments, the queue number value 158B for the child process 136B may be set to the queue number value 158A for the parent process 136A (illustrated as 'QUEUE1' in FIG. 3A) and the sequence number value 156B for the child process 136B may be set to the sequence number value 156A for the parent process 136A (illustrated as 'SEQNO1' in FIG. 3A). In some embodiments, the process tracking engine 155 may associate the new process 136 with an invalid value (e.g., 'NO_UPID' and/or 0) for the UPID 154B rather than the value for the UPID 154A of the parent process 136A. Because this new process 136B has resulted from a fork operation but has not yet performed an exec operation or other trackable activity, it may not be assigned a valid value for a UPID 154B.

As will be appreciated by those of skill in the art, the above-described operations do not require locking or reference counting and thus may work reliably in infrastructures similar to eBPF. For example, locks may not be needed because the operations may update the PID-to-UPID mapping store 160 under scenarios which may not need locking to maintain consistency in a concurrent environment (e.g., in a multiprocessing environment). For example, the PID-to-UPID mapping store 160 may be updated within the hooks 144 for exec, filesystem, and network system calls for a given process 136, but may update entries in the PID-to-UPID mapping store 160 for only that process 136. Since the process 136 may be frozen in a system call at the time of the update to the PID-to-UPID mapping store 160, no other hooks 144 may operate concurrently on behalf of that process 136. For example, in the hook 144 for a fork operation, the tracking entries in the PID-to-UPID mapping store 160 may be updated for both the parent and child processes 136, but since both parent and child processes 136 are frozen during this fork system call, concurrent updates to the same entries are avoided.

Though the above discussion describes operations with respect to processes 136, the embodiments of the present disclosure are not limited to such a configuration. In some embodiments, the same or similar processing may be performed with respect to the generating of new threads, in a threaded environment, as illustrated in FIG. 1. In thread environments, tracking may be based on thread IDs (or thread group IDs) rather than, or in addition to, process IDs 134.

Referring back to FIG. 1, once initialized, a given entry for a process 136 in the PID-to-UPID mapping store 160 may not be updated until trackable activity is detected for the process 136. In other words, messages 180 may not be sent to the application 140 on behalf of the process 136 until the process does something of note (e.g., trackable activity) for the application extension 150 to report upon. At this time, the process tracking engine 155 of the application extension 150 may generate a UPID 154 to be associated with the process 136. At a same or similar time, the process tracking engine 155 of the application extension 150 may assign the process 136 to one of the message queues 195.

Figure 3B:
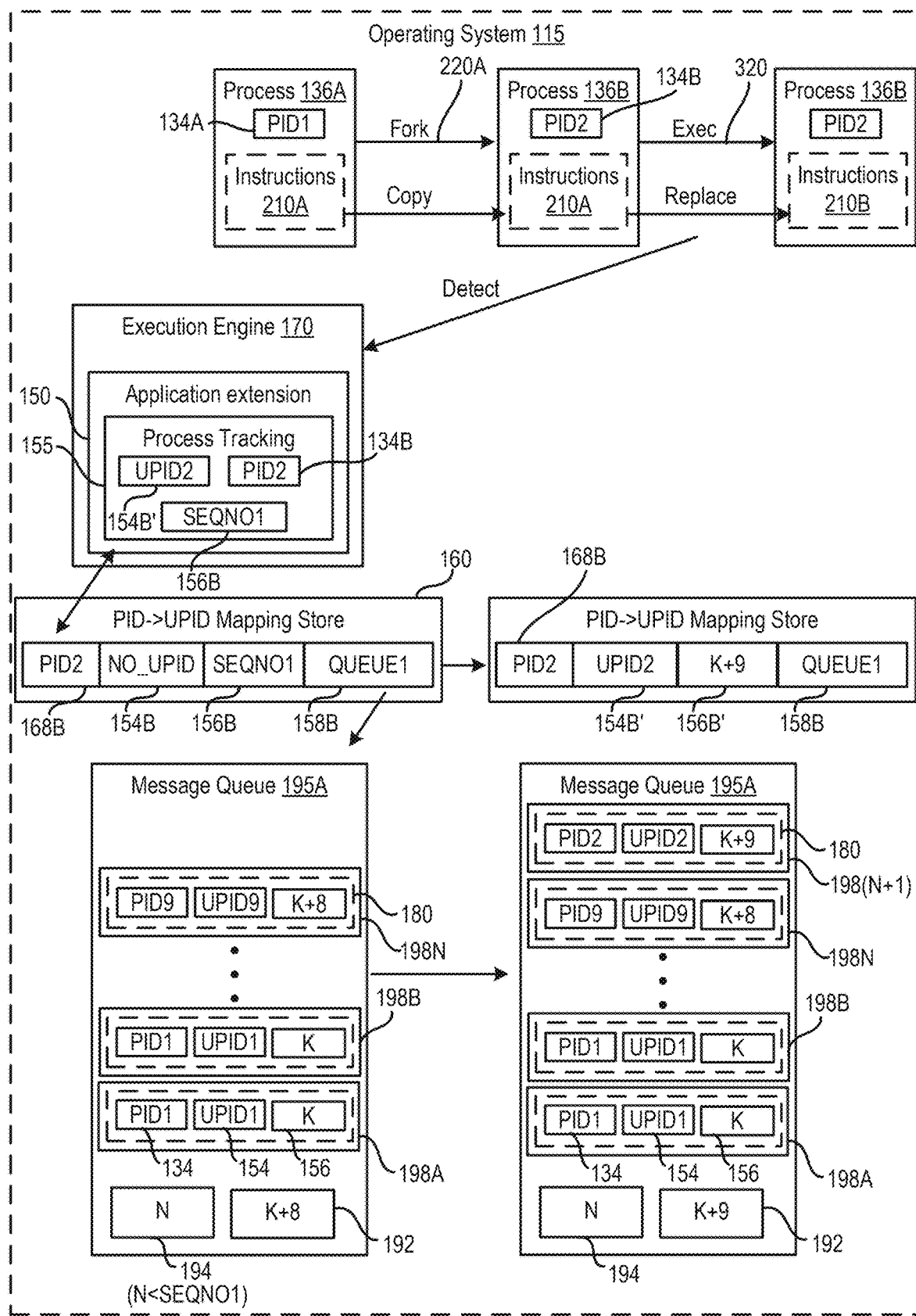
FIG. 3B is a block diagram illustrating the initialization of a message queue associated with a process when a consumer has not yet processed the parent process, in accordance with some embodiments of the present disclosure.

FIG. 3B is a block diagram illustrating the initialization of a message queue 195 associated with a process 136 when a consumer has not yet processed the parent process 136, in accordance with some embodiments of the present disclosure. FIG. 3B is an example only, and is not intended to limit the embodiments of the present disclosure. A description of those elements of FIG. 3B that have been previously described will be omitted for brevity.

In FIG. 3B, an initial fork operation 220 is illustrated that creates a new process 136B from a parent process 136A, as described herein with respect to FIG. 3A. As a result, a duplicate description thereof will be omitted. As described herein, the fork operation 220 may result in a child process having a copy of the instructions 210A of the parent process 136. FIG. 3B illustrates that the child process may further perform as exec operation 320.

As part of the exec operation 320, the first instructions 210A of the second process 136B may be replaced by second instructions 210B. The replacement of the first instructions 210A with the second instructions 210B may result in the second process 136B executing a different application/executable from the first process 136A. Thus, the first process 136A (the parent process 136A) may be executing the first instructions 210A, while the second process 136B (the child process 136B) may be executing a different set of second instructions 210B after the exec operation 320.

In some embodiments, the performance of the exec operation 320 may be a trackable activity. In other words, the detection of the exec operation 320 may be an operation that the process tracking engine 155 wishes to track and/or create a message 180 that refers to and/or documents the exec operation 320. As illustrated in FIG. 3B, the first process 136A may have a first PID 134A of 'PID1' and the second process 136B may have a second PID 134B of 'PID2'. As part of the exec operation 320, the value of the PID 134B of the child process 136B may not change.

As illustrated in FIG. 3B, in response to detecting the exec operation 320, the process tracking engine 155 may perform a lookup in the PID-to-UPID mapping store 160 for the PID 134B of the second process 136B. Utilizing the second PID 134B, the process tracking engine 155 may access the PID-to-UPID mapping store 160 to access the values of the UPID 154B, the sequence number 156B, and/or the queue number 158B from the PID-to-UPID mapping store 160 that are associated with the second PID 134B. In response to detecting the exec operation, the process tracking engine 155 may generate a new UPID 154B' to be associated with the second PID 134B of the second process 136B (illustrated as having a value of 'UPID2'). As described herein, the new UPID 154B' may be unique with respect to other UPIDs 154 associated with other PIDs 134 of the operating system 115.

The process tracking engine 155 may utilize the queue number 158B to identify a first message queue 195A of the plurality of message queues 195 that is associated with the PID 134B. As described with respect to FIG. 3A, upon initialization, this message queue number 158B will be the same as the message queue number 158A of the parent process 136A. In the example of FIG. 3B, it is illustrated that the queue number 158B has a value of 'QUEUE1' which is illustrated to map to a first message queue 195A. In the example of FIG. 3B, 'QUEUE1' is intended to uniquely identify one of the plurality of message queues 195. For example, 'QUEUE1' may be an index or other integer that identifies the first message queue 195A from among the plurality of message queues 195.

Upon identifying the message queue 195A, the process tracking engine 155 may examine the consumer counter 194 of the message queue 195A. The process tracking engine may compare the current value of the consumer counter 194 with the sequence number value 156B. If the consumer counter 194 of the first message queue 195A is less than the sequence number value 156B, the process tracking engine 155 may determine that messages 180 associated with the parent process 136A have not yet been processed. In FIG. 3B, it is illustrated that the sequence number 156B associated with the child process 136B is 'SEQNO1' while the consumer counter 194 is 'N'. For the purposes of the example of FIG. 3B, it is assumed that N is less than SEQNO1.

For example, as described with respect to FIG. 3A, the sequence number 156 for a given process 136B is initialized to the sequence number 156 of its parent process 136A. Moreover, as described herein with respect to FIG. 2, a consumer (e.g., application 140) of the message queue 195A is configured to set the consumer counter 194 to the sequence number 156 associated with the process 136 of the most recently processed message 180. Thus, if the child process 136B has the same sequence number 156B and message queue number 158B as its parent process 136A upon initialization, and the consumer counter 194 for the message queue 195A associated with the message queue number 158B is less than the sequence number 156B of the parent process 136A, then the application 140 has not yet processed the messages 180 associated with the parent process 136A. As noted herein, in such a scenario it may be problematic to put the messages 180 associated with the child process 136B on another message queue 195, since they have a chance of being processed out of order from the parent process 136A. Stated another way, since the application 140 has not yet seen a message 180 associated with the parent process 136A of the child process 136B, placing the child process 136B on another message queue 195 other than the message queue 195A of the parent process 136A runs the risk of the messages 180 related to the child process 136B being processed out of order with respect to the parent process 136A.

As a result, when the consumer counter 194 of the message queue 195A is less than the sequence number 156B of the child process 136B at the time the UPID 154B' for the child process 136B is generated, the child process 136B will be assigned to the same message queue 195A as the parent process 136A. In other words, the message queue number 158B of the child process 136B may be set to the same value as that of the parent process 136A (in this case, illustrated as a value of 'QUEUE1').

Once the appropriate message queue 195A has been selected, the sequence number 156B may be updated based on this selection. A new sequence number 156B' may be generated based on the current producer counter 192 of the selected message queue 195A. For example, the value of the producer counter 192 may be incremented, and the incremented value of the producer counter 192 may be utilized for the updated sequence number 156B'. For example, as illustrated in FIG. 3B, the producer counter 192 has a value of 'K+8'. That value may be incremented to 'K+9' and the incremented value may be utilized to set the updated sequence number 156B' to 'K+9'.

As a result of the analysis described with respect to FIG. 3B, at least two operations may be performed. First, the mapping entry 168B in the PID-to-UPID mapping store 160 may be updated to contain the generated UPID 154B', the queue number 158B (which in this case has not changed), and/or the updated sequence number 156B'.

In addition, a new message 180 may be added to a message entry 198(N+1) in the message queue 195A. For example, the message 180 in the message entry 198(N+1) may include the PID 134B ('PID2' in this example), the generated UPID 154B' ('UPID2' in this example), and the updated sequence number 156B' ('K+9' in this example).

Figure 3C:
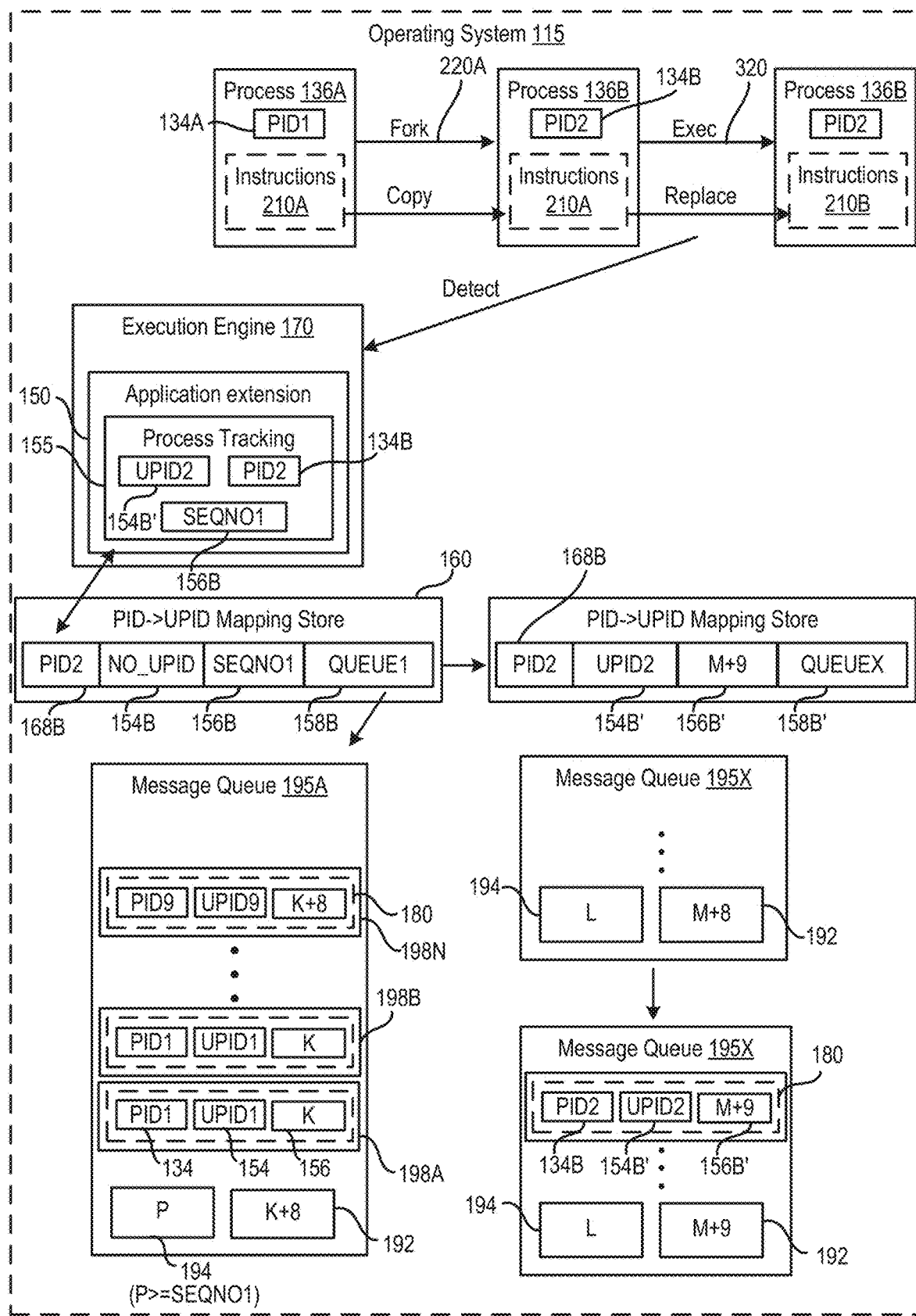
FIG. 3C is a block diagram illustrating the initialization of a message queue associated with a process when a consumer has processed the parent process, in accordance with some embodiments of the present disclosure.

FIG. 3C is a block diagram illustrating the initialization of a message queue 195 associated with a process 136 when a consumer has processed the parent process 136, in accordance with some embodiments of the present disclosure. FIG. 3C is an example only, and is not intended to limit the embodiments of the present disclosure. A description of those elements of FIG. 3C that have been previously described will be omitted for brevity.

In FIG. 3C, an initial fork operation 220 is illustrated that creates a new process 136B from a parent process 136A, as described herein with respect to FIG. 3A. In addition, FIG. 3C illustrates that the second process 136B performs an exec operation 320, as described herein with respect to FIG. 3B. As a result, a duplicate description thereof will be omitted.

As illustrated in FIG. 3C, in response to detecting the exec operation 320, the process tracking engine 155 may perform a lookup in the PID-to-UPID mapping store 160 for the PID 134B of the second process 136B. Utilizing the second PID 134B, the process tracking engine 155 may access the PID-to-UPID mapping store 160 to access the values of the UPID 154B, the sequence number 156B, and/or the message queue number 158B from the PID-to-UPID mapping store 160 that are associated with the second PID 134B. In response to detecting the exec operation 320, the process tracking engine 155 may generate a new UPID 154B' to be associated with the second PID 134B of the second process 136B (illustrated as having a value of 'UPID2'). As described herein, the new UPID 154B' may be unique with respect to other UPIDs 154 associated with other PIDs 134 of the operating system 115.

The process tracking engine 155 may utilize the message queue number 158B to identify a first message queue 195A of the plurality of message queues 195 that is associated with the PID 134B. As described with respect to FIG. 3A, upon initialization, this message queue number 158B will be the same as that of the parent process 136A. In the example of FIG. 3C, it is illustrated that the queue number 158B has a value of 'QUEUE1' which is illustrated to map to a first message queue 195A. In the example of FIG. 3C, 'QUEUE1' is intended to uniquely identify the first message queue 195A of the plurality of message queues 195. For example, 'QUEUE1' may be an index or other integer that identifies the first message queue 195A of a plurality of message queues 195.

Upon identifying the message queue 195A, the process tracking engine 155 may examine the consumer counter 194 of the message queue 195. The process tracking engine may compare the current value of the consumer counter 194 with the sequence number value 156B from the PID-to-UPID mapping store 160. If the consumer counter 194 of the first message queue 195A is greater than or equal to the sequence number value 156B, the process tracking engine 155 may determine that messages 180 associated with the parent process 136A have been processed. In FIG. 3C, it is illustrated that the sequence number 156B associated with the child process 136B is 'SEQNO1' while the consumer counter 194 is 'P'. For the purposes of the example of FIG. 3C, it is assumed that P is greater than or equal to SEQNO1.

For example, as described with respect to FIG. 3B, the consumer counter 194 of the initial message queue number 158B (which equals the message queue number 158A of the parent process 136A) may be utilized to determine which messages 180 have been processed for the parent process 136A. Since the child process 136B has the same sequence number 156B as the parent, and the consumer counter 194 of the first message queue 195A indicates that sequence numbers 156 that are greater than or equal to the sequence number 156B have been processed, it may be assumed that at least a message 180 associated with the creation of the parent process 136A has been processed.

As a result, when the consumer counter 194 of the message queue 195A is greater than or equal to the sequence number 156B of the child process 136B at the time the UPID 154B' for the child process 136B is generated, the child process 136B may be assigned to a new message queue 195. In some embodiments, the assignment may be based upon the PID 134B of the child process 136B. For example, an index to the message queue 195 may be based on a hash of the PID 134B, or other calculation. For example, the message queue 195 may be assigned based on a calculation of (PID value mod (number of message queues)). In some embodiments, the assignment of the message queue 195 may be done in a round-robin fashion.

In FIG. 3C, it is illustrated that a message queue 195X is selected that is different from the message queue 195A of the parent process 136A. In the example of FIG. 3C, the selected message queue 195X may be indexed by a message queue number 158B' of 'QUEUEX' and the message queue 195X has a consumer counter 194 having a value of 'L' and a producer counter 192 having a value of 'M+8'. To reflect the change to the message queue 195X, the message queue number 158B may be adjusted to a modified message queue number 158B' of 'QUEUEX'.

Once the appropriate message queue 195X has been selected, the sequence number 156B may be updated based on this selection. A new sequence number 156B' may be generated based on the current producer counter 192 of the selected message queue 195X. For example, the value of the producer counter 192 may be incremented, and the incremented value of the producer counter 192 may be utilized for the updated sequence number 156B'. For example, as illustrated in FIG. 3C, the producer counter 192 of the selected message queue 195X has a value of 'M+8'. That value may be incremented to 'M+9' and the incremented value may be utilized to set the updated sequence number 156B' to 'M+9'.

As a result of the analysis described with respect to FIG. 3C, at least two operations may be performed. First, the mapping entry 168B in the PID-to-UPID mapping store 160 may be updated to contain the generated UPID 154B' ('UPID2' in FIG. 3C), the modified queue number 158B' (which has been changed to 'QUEUEX' based on the assignment to the new message queue 195X), and the updated sequence number 156B' ('M+9' in FIG. 3C).

In addition, a new message 180 may be added to a message entry 198A in the message queue 195A. For example, the message 180 may include, among other data, the PID 134B, the generated UPID 154B', and/or the updated sequence number 156B'.

Figure 4:
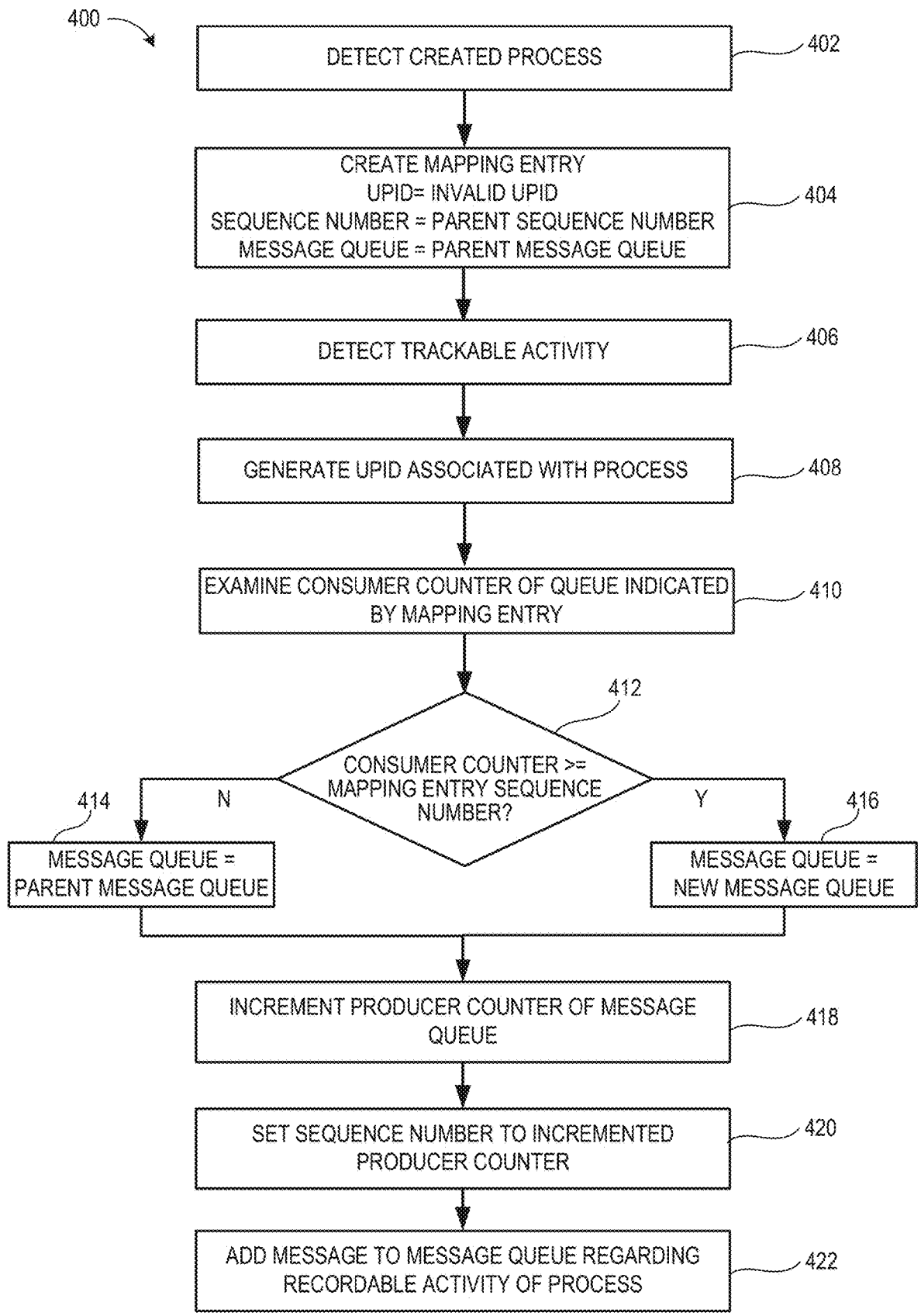
FIG. 4 is a flow diagram of a method of generating an exec parent according to some embodiments of the present disclosure.

FIG. 4 is a flow diagram of a method 400 of generating an exec parent according to some embodiments of the present disclosure. A description of elements of FIG. 4 that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 through 3C and 4 as well, the method 400 begins at block 402, in which the creation of a process 136B is detected. In some embodiments, creation of the process 136B may be detected by executable instructions in the kernel space 130 of an operating system 115, such as the process tracking engine 155 described herein with respect to FIG. 1. In some embodiments, the creation of the process 136B may be detected by hooks 144 that detect operations of a process management engine 132 of the kernel space 130. In some embodiments, upon detection of the creation of the process 136B, a UPID 154 associated with the created process 136 may be set to an initial value. In some embodiments, the initial value may be a value intended to represent an invalid value for the UPID 154, such as the value of 0.

At block 404, an initial mapping entry may be created for the process 136. In the initial mapping entry, the UPID 154 may be set to an invalid UPID entry, a sequence number 156 may be set to a sequence number 156 of a parent process 136A of the process 136B, and a message queue number 158 may be set to a message queue number 158 of the parent process 136A of the child process 136B.

Though the parent process 136A is described herein as being a process 136 that performed a fork operation to generate the child process 136B, embodiments of the present disclosure are not limited to this configuration. In some embodiments, other processes 136 in the ancestry of the child process 136B may be utilized to generate the initial values for the sequence number 156 and the message queue number 158 for the child process 136B. The ancestry of a process may refer to the parent process 136A of a child process 136B (e.g., the parent process 136A that performed a fork operation to spawn the child process 136B) as well as the parent process 136 of the parent process 136A, the parent process 136 of the parent process 136 of the parent process 136A, and so on.

In some embodiments, the parent process 136 that may be utilized to generate the initial values for the sequence number 156 and the message queue number 158 for the child process 136B may be an exec parent of the child process 136B. As used herein, the exec parent associated with a given process 136 may indicate a process 136 that last performed an exec operation within the ancestry of the given process 136. The use of the exec parent may assist in tracking an exec relationship between a plurality of processes 136 of the operating system 115.

At block 406, the process 136 may be detected performing trackable activity. In some embodiments, the trackable activity may be an exec operation 320. In some embodiments, the trackable activity may be detected by hooks 144 executing within the kernel space 130 of an operating system 115. Other types of trackable activity that may be detected by the hooks 144 include activity of interest to the process tracking engine 155 that the process tracking engine 155 may be able to detect. Examples of a trackable activity include, but are not limited to, accessing a network connected to the computing device 120, performing an access to storage (e.g., storage device 126), accessing specialized hardware, such as a cryptographic device and/or graphics processing unit (GPU), or other computing operation.

At block 408, in response to the trackable activity, a UPID 154 may be generated for the process 136B. In some embodiments, the UPID 154 may be unique to other processes 136 executing on the operating system 115, as well as to processes 136 that have exited.

At block 410, a consumer counter 194 of a message queue 195 indicated by a mapping entry 168 associated with the process 136 may be examined. For example, a PID 134 of the process 136B may be utilized to access the mapping entry 168 of a PID-to-UPID mapping store 160. The mapping entry 168 of the PID-to-UPID-mapping store 160 may include the message queue number 158 identifying the message queue 195.

In some embodiments, the mapping entry 168 of the PID-to-UPID-mapping store 160 may also indicate a sequence number 156. At block 412, it may be determined if the consumer counter 194 of the message queue 195 indicated by the message queue number 158 is greater than or equal to the sequence number 156 of the mapping entry 168.

If the consumer counter 194 is greater than or equal to the sequence number 156 of the mapping entry 168 (block 412:Y), the message queue number 158 associated with the process 136B may be set to indicate a new message queue 195 at block 416. In some embodiments, the new message queue 195 may be set based on a round robin assignment among the message queues 195. In some embodiments, the mapping entry 168 of the PID-to-UPID mapping store 160 associated with the process 136 may be updated to reflect the updated message queue number 158.

If the consumer counter 194 is not greater than or equal to the sequence number 156 of the mapping entry 168 (block 412:N), the message queue number 158 associated with the process 136B may be set to be associated with the message queue number 158 of the parent of the process 136B at block 414. In some embodiments, the mapping entry 168 of the PID-to-UPID mapping store 160 associated with the process 136B may be updated to reflect the updated message queue number 158, though the embodiments of the present disclosure are not limited to these operations. In some embodiments, since the message queue number 158 of the mapping entry may have been initialized to the message queue number 158 of the parent process 136A, block 414 may leave the initialized message queue number 158 of the mapping entry 168 unchanged.

At block 418, the producer counter 192 of the selected message queue 195 (e.g., either the new message queue 195 of block 416 or the message queue 195 of the parent of block 414) may be incremented.

At block 420, the sequence number 156 of the process 136B may be set to the incremented value of the producer counter 192. In some embodiments, the mapping entry 168 of the PID-to-UPID mapping store 160 associated with the process 136B may be updated to reflect the updated sequence number 156.

At block 422, a message 180 may be added to the selected message queue 195 regarding the trackable activity of the process 136B. In some embodiments, the message 180 may include the PID 134, the UPID 154, and the sequence number 156 associated with the process 136B.

The method 400 illustrated in FIG. 4 may allow for a relatively straightforward algorithm to detect and track processes 136 within an operating system 115. By utilizing sequence numbers in coordination with consumer counters of the message queues, it may be quickly determined whether messages associated with a parent have been processed. If the messages associated with the parent have not yet been processed, the messages for the child may be placed on the same message queue as the parent to enforce consistency between those messages. If the messages associated with the parent have been processed, the messages for the child may be placed on a different message queue, which may increase the capability for concurrency within the messaging operations. Embodiments of the present disclosure may allow for coherent and/or consistent messaging in a concurrent system that does not require locking. The absence of locking may be preferable in environments such as eBPF in which an application extension 150 is executing within the kernel space 130 of the operating system 115.

Figure 5:
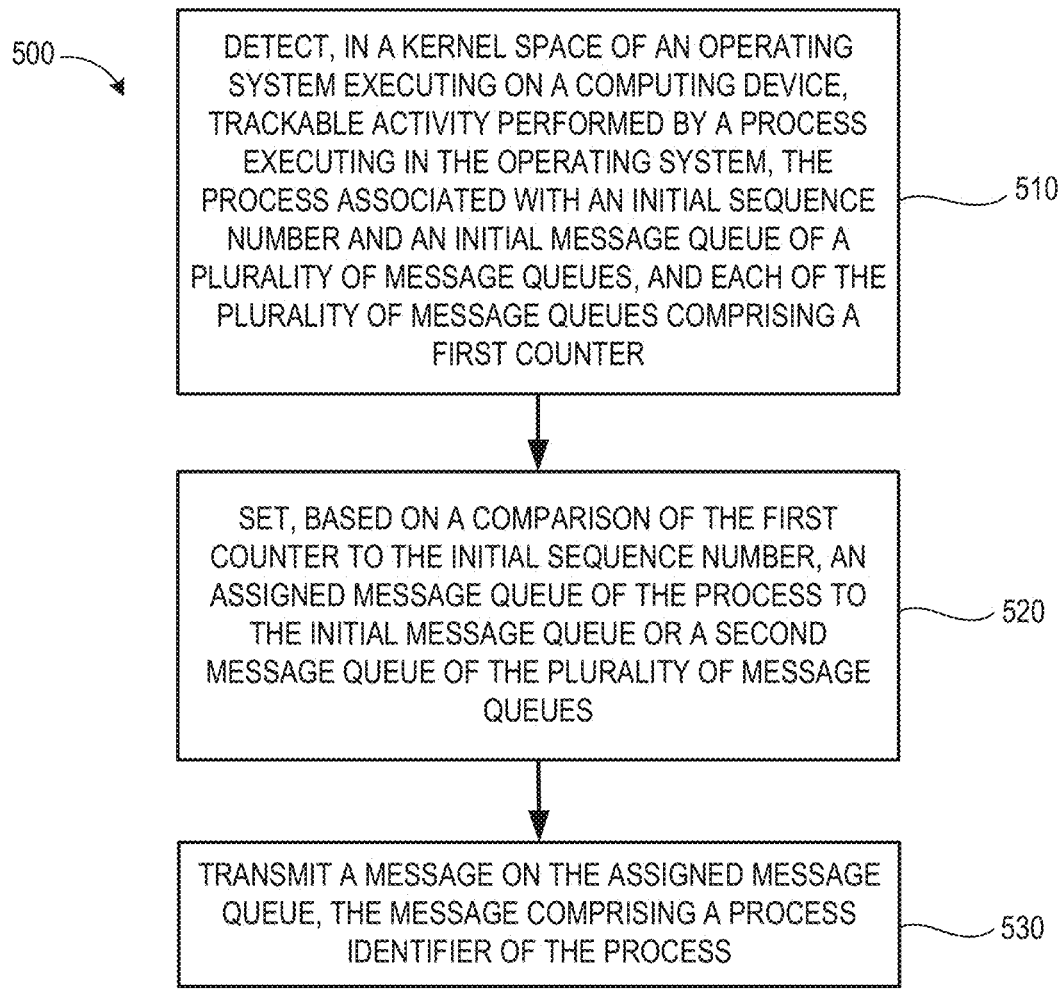
FIG. 5 is a flow diagram of a method of tracking processes in an operating system, according to some embodiments of the present disclosure.

FIG. 5 is a flow diagram of a method 500 of tracking processes in an operating system, according to some embodiments of the present disclosure. A description of elements of FIG. 5 that have been previously described will be omitted for brevity. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring simultaneously to FIGS. 1, 2, 3A, 3B, 3C, and 4 as well, the method 500 begins at block 510, in which trackable activity performed by a process executing in an operating system is detected in a kernel space of the operating system executing on a computing device. The process may be associated with an initial sequence number and an initial message queue of a plurality of message queues. Each of the plurality of message queues may include a first counter. The first counter may be similar to the consumer counter 194 described herein with respect to FIGS. 1 to 4. The kernel space may be similar to kernel space 130 of an operating system 115 of a computing device 120, as described herein with respect to FIGS. 1 to 4. The process may be similar to process 136 described herein with respect to FIGS. 1 to 4. The plurality of message queues may be similar to the plurality of message queues 195 described herein with respect to FIGS. 1 to 4. The sequence number and the message queue may be similar to the sequence number 156 and the message queue number 158, respectively, described herein with respect to FIGS. 1 to 4. Setting the initial values of the sequence number and the message queue may be similar to operations described herein with respect to FIG. 3A.

In some embodiments, the trackable activity comprises at least one of performing an exec operation, accessing a network connected to the computing device, or performing an access to a storage device.

At block 520, based on a comparison of the first counter to the initial sequence number, an assigned message queue of the process is set to the initial message queue or a second message queue of the plurality of message queues. In some embodiments, responsive to the first counter being greater than or equal to the initial sequence number, an assigned message queue of the process may be set to a second message queue of the plurality of message queues. Assigning the message queue when the first counter is greater than or equal to the initial sequence number may be similar to the operations described herein with respect to FIG. 3B. In some embodiments, responsive to the first counter being less than the initial sequence number, the assigned message queue of the process may be set to the initial message queue Assigning the message queue when the first counter is less than the initial sequence number may be similar to the operations described herein with respect to FIG. 3C. In some embodiments, setting the assigned message queue of the process to the second message queue of the plurality of message queues includes selecting the second message queue from the plurality of message queues based on a round-robin algorithm.

In some embodiments, the assigned message queue is set by an application extension executing in an extended Berkeley packet filter (eBPF) infrastructure within the operating system of the computing device. The application extension may be similar to the application extension 150 described herein with respect to FIGS. 1 to 4.

At block 530, a message may be transmitted on the assigned message queue, the message comprising a process identifier of the process. The message may be similar to message 180, as described herein with respect to FIGS. 1 to 4. The process identifier may be similar to PID 134, as described herein with respect to FIGS. 1 to 4.

In some embodiments, each of the plurality of message queues comprises a second counter, and the method 500 further includes incrementing the second counter of the assigned message queue to obtain an updated sequence number and associating the updated sequence number with the process. The message may further include the updated sequence number. The second counter may be similar to the producer counter 192 described herein with respect to FIGS. 1 to 4. Incrementing the sequence number may be similar to the operations described herein with respect to FIGS. 3B and 3C.

In some embodiments, method 500 further includes processing the message from the assigned message queue and setting a value of the first counter of the assigned message queue to the updated sequence number. Setting the value of the first counter may be similar to the operations described herein with respect to FIG. 2 and the consumer counter 194.

In some embodiments, the method 500 further includes generating a UPID associated with the PID of the process, associating the UPID with the process in a mapping store that maps the PID to the UPID, and tracking process activity of the process executing in the operating system to generate process activity data that comprises the UPID. The UPID may be similar to the UPID 154 described herein with respect to FIGS. 1 to 4. The mapping store may be similar to the PID-to-UPID mapping store 160 described herein with respect to FIGS. 1 to 4. The process activity data may be similar to the process activity data 175 described herein with respect to FIGS. 1 to 4.

Figure 6:
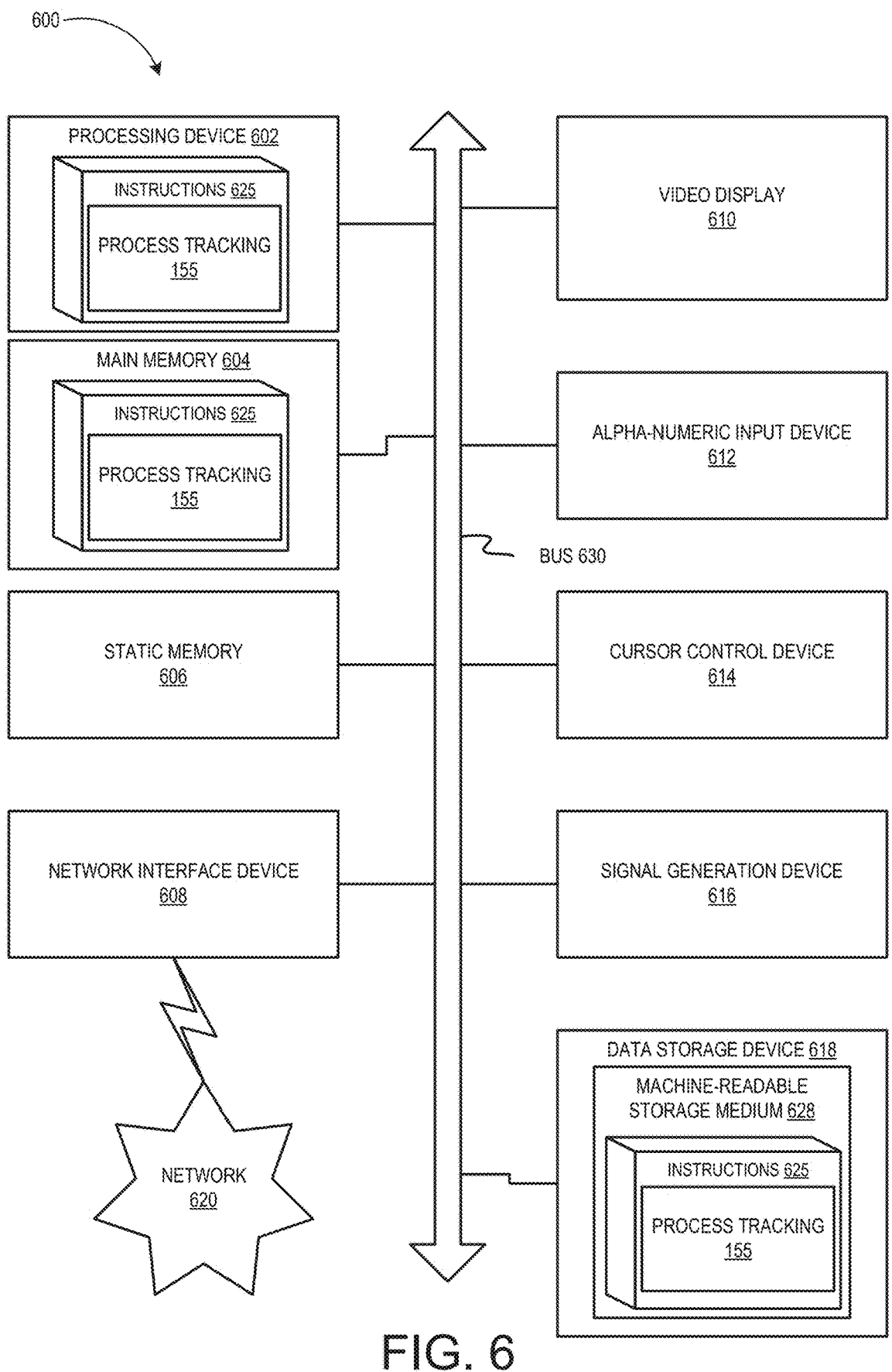
FIG. 6 is a block diagram of an example computing device that may perform one or more of the operations described herein, in accordance with embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a tracking process activity, e.g., process tracking engine 155, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "detecting," "setting," "transmitting," "incrementing," "associating," "processing," "generating," "tracking," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
    detecting, in a kernel space of an operating system executing on a computing device, trackable activity performed by a process executing in the operating system, the process associated with an initial sequence number and an initial message queue of a plurality of message queues, and each of the plurality of message queues comprising a first counter;
    setting, based on a comparison of the first counter to the initial sequence number by a processing device, an assigned message queue of the process to the initial message queue or a second message queue of the plurality of message queues; and
    transmitting a message on the assigned message queue, the message comprising a process identifier (PID) of the process.

2. The method of claim 1, wherein each of the plurality of message queues comprises a second counter, the method further comprising:
    incrementing the second counter of the assigned message queue to obtain an updated sequence number; and
    associating the updated sequence number with the process, wherein the message further comprises the updated sequence number.

3. The method of claim 2, wherein the method further comprises:
    processing the message from the assigned message queue; and
    setting a value of the first counter of the assigned message queue to the updated sequence number.

4. The method of claim 1, wherein setting the assigned message queue of the process to the second message queue of the plurality of message queues comprises selecting the second message queue from the plurality of message queues based on a round-robin algorithm.

5. The method of claim 1, wherein the assigned message queue is set by an application extension executing in an extended Berkeley packet filter (eBPF) infrastructure within the operating system of the computing device.

6. The method of claim 1, wherein the trackable activity comprises at least one of performing an exec operation, accessing a network connected to the computing device, or performing an access to a storage device.

7. The method of claim 1, further comprising:
    generating a unique process identifier (UPID) associated with the PID of the process;
    associating the UPID with the process in a mapping store that maps the PID to the UPID; and
    tracking process activity of the process executing in the operating system to generate process activity data that comprises the UPID.

8. A system comprising:
    a memory; and
    a processing device, operatively coupled to the memory, to:
        detect, in a kernel space of an operating system executing on a computing device, trackable activity performed by a process executing in the operating system, the process associated with an initial sequence number and an initial message queue of a plurality of message queues, and each of the plurality of message queues comprising a first counter;

set, based on a comparison of the first counter to the initial sequence number, an assigned message queue of the process to the initial message queue or a second message queue of the plurality of message queues; and transmit a message on the assigned message queue, the message comprising a process identifier (PID) of the process.

9. The system of claim 8, wherein each of the plurality of message queues comprises a second counter, and wherein the processing device is further to:

increment the second counter of the assigned message queue to obtain an updated sequence number; and associate the updated sequence number with the process, wherein the message further comprises the updated sequence number.

10. The system of claim 9, wherein the processing device is further to:

process the message from the assigned message queue; and set a value of the first counter of the assigned message queue to the updated sequence number.

11. The system of claim 8, wherein, to set the assigned message queue of the process to the second message queue of the plurality of message queues, the processing device is to select the second message queue from the plurality of message queues based on a round-robin algorithm.

12. The system of claim 8, wherein the assigned message queue is set by an application extension executing in an extended Berkeley packet filter (eBPF) infrastructure within the operating system of the computing device.

13. The system of claim 8, wherein the trackable activity comprises at least one of performing an exec operation, accessing a network connected to the computing device, or performing an access to a storage device.

14. The system of claim 8, wherein the processing device is further to:

generate a unique process identifier (UPID) associated with the PID of the process;

associate the UPID with the process in a mapping store that maps the PID to the UPID; and track process activity of the process executing in the operating system to generate process activity data that comprises the UPID.

15. A non-transitory computer-readable storage medium including instructions that, when executed by a processing device, cause the processing device to:

detect, in a kernel space of an operating system executing on a computing device, trackable activity performed by a process executing in the operating system, the process associated with an initial sequence number and an initial message queue of a plurality of message queues, and each of the plurality of message queues comprising a first counter;

set, based on a comparison of the first counter to the initial sequence number, an assigned message queue of the process to the initial message queue or a second message queue of the plurality of message queues; and transmit a message on the assigned message queue, the message comprising a process identifier (PID) of the process.

16. The non-transitory computer-readable storage medium of claim 15, wherein each of the plurality of message queues comprises a second counter, and wherein the processing device is further to:

increment the second counter of the assigned message queue to obtain an updated sequence number; and associate the updated sequence number with the process, wherein the message further comprises the updated sequence number.

17. The non-transitory computer-readable storage medium of claim 16, wherein the processing device is further to:

process the message from the assigned message queue; and set a value of the first counter of the assigned message queue to the updated sequence number.

18. The non-transitory computer-readable storage medium of claim 15, wherein, to set the assigned message queue of the process to the second message queue of the plurality of message queues, the processing device is to select the second message queue from the plurality of message queues based on a round-robin algorithm.

19. The non-transitory computer-readable storage medium of claim 15, wherein the trackable activity comprises at least one of performing an exec operation, accessing a network connected to the computing device, or performing an access to a storage device.

20. The non-transitory computer-readable storage medium of claim 15, wherein the processing device is further to:

generate a unique process identifier (UPID) associated with the PID of the process;

associate the UPID with the process in a mapping store that maps the PID to the UPID; and track process activity of the process executing in the operating system to generate process activity data that comprises the UPID.

* * * * *